(12) United States Patent
Arai

(10) Patent No.: US 7,743,867 B2
(45) Date of Patent: Jun. 29, 2010

(54) MOTORCYCLE

(75) Inventor: Nobuhiro Arai, Shizuoka (JP)

(73) Assignee: Yamaha Hatsudoki Kabushiki Kaisha, Iwata-shi (JP)

(*) Notice: Subject to any disclaimer, the term of this patent is extended or adjusted under 35 U.S.C. 154(b) by 302 days.

(21) Appl. No.: 11/847,165

(22) Filed: Aug. 29, 2007

(65) Prior Publication Data
US 2008/0053730 A1 Mar. 6, 2008

(30) Foreign Application Priority Data
Sep. 5, 2006 (JP) .............................. 2006-240840

(51) Int. Cl.
*B62K 11/00* (2006.01)
(52) U.S. Cl. ..................... 180/219; 180/309; 60/276
(58) Field of Classification Search .................. 180/219, 180/309
See application file for complete search history.

(56) References Cited

U.S. PATENT DOCUMENTS

| | | | |
|---|---|---|---|
| 5,360,081 A | 11/1994 | Takegami | |
| 6,820,708 B2 * | 11/2004 | Nakamura | 180/68.2 |
| 2004/0129482 A1 * | 7/2004 | Takenaka et al. | 180/309 |
| 2006/0090945 A1 * | 5/2006 | Ishida et al. | 180/230 |

FOREIGN PATENT DOCUMENTS

| | | |
|---|---|---|
| JP | 03-087905 | 9/1991 |
| JP | 08-150898 | 6/1996 |
| JP | 11-343895 | 12/1999 |
| JP | 2000310116 A | 11/2000 |
| JP | 2004-316430 | 11/2004 |
| JP | 2006-009648 | 1/2006 |
| JP | 2006152962 A | 6/2006 |
| JP | 20006170938 A | 6/2006 |

OTHER PUBLICATIONS

European search report for corresponding European application 07016501 lists the references above.

* cited by examiner

*Primary Examiner*—Lesley Morris
*Assistant Examiner*—Jacob Knutson
(74) *Attorney, Agent, or Firm*—Rabin & Berdo, PC

(57) ABSTRACT

An exhaust gas sensor for a motorcycle that is protected against sprayed mud and flying stones without a dedicated protective cover. The exhaust gas sensor is inclined inward to the inside of the motorcycle body relative to a vertical line passing through a sensor attachment part formed on an upper part of an exhaust pipe on the inside of a main frame. The exhaust gas sensor is positioned above a pivot shaft of a seat cushion, in front of a shock absorber, and in front of a mud flap in front of a rear wheel. The exhaust gas sensor is protected by the exhaust pipe at a lower portion of the sensor. A front portion of the exhaust gas sensor is surrounded and protected by parts around the handlebars and parts around the engine. Both sides of the exhaust gas sensor are surrounded and protected by the main frame, the engine, the parts around the engine, and various parts engaging the shock absorber. A rear portion of the exhaust gas sensor is protected by the mud flap.

15 Claims, 4 Drawing Sheets

[FIG. 3]
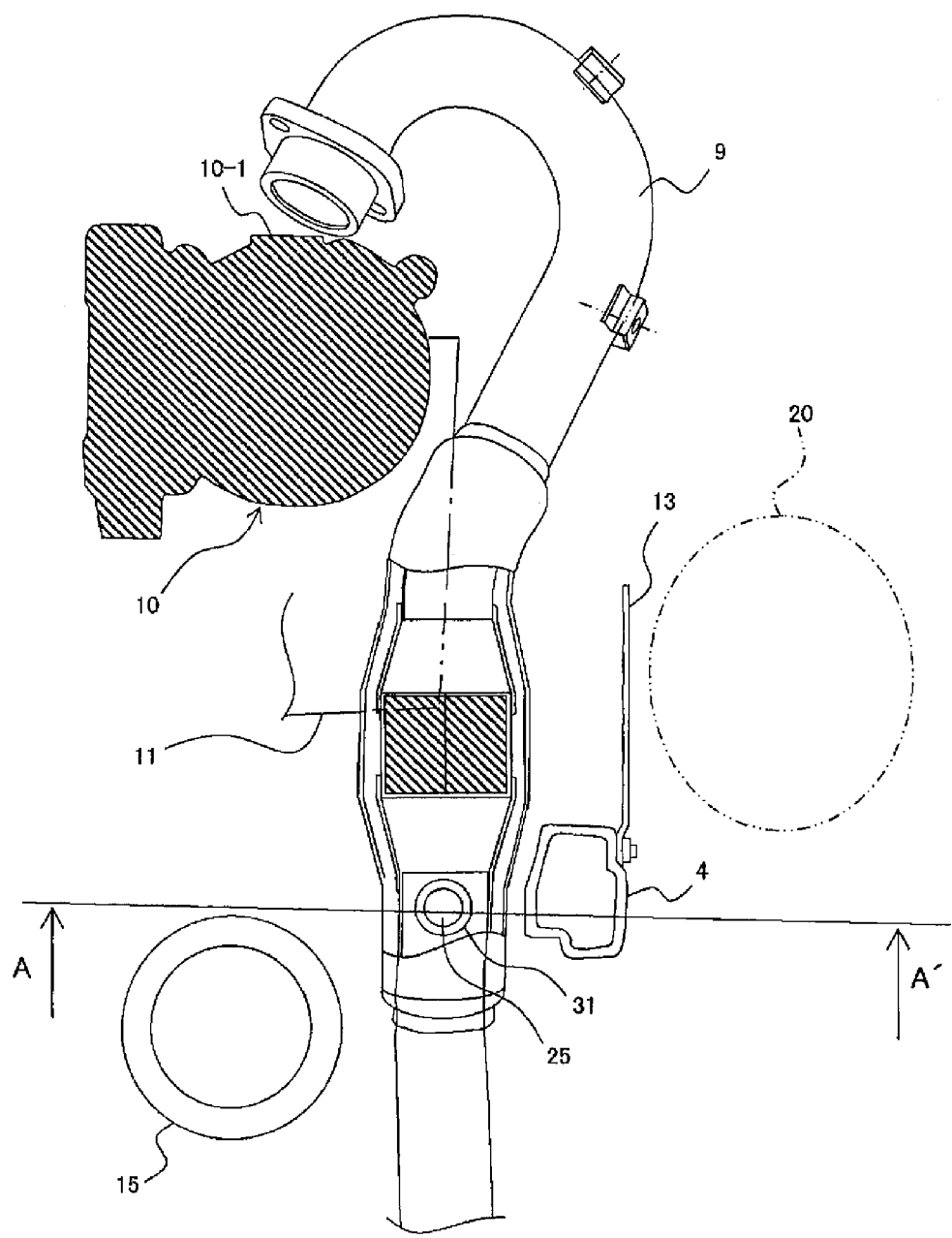

[FIG. 4]
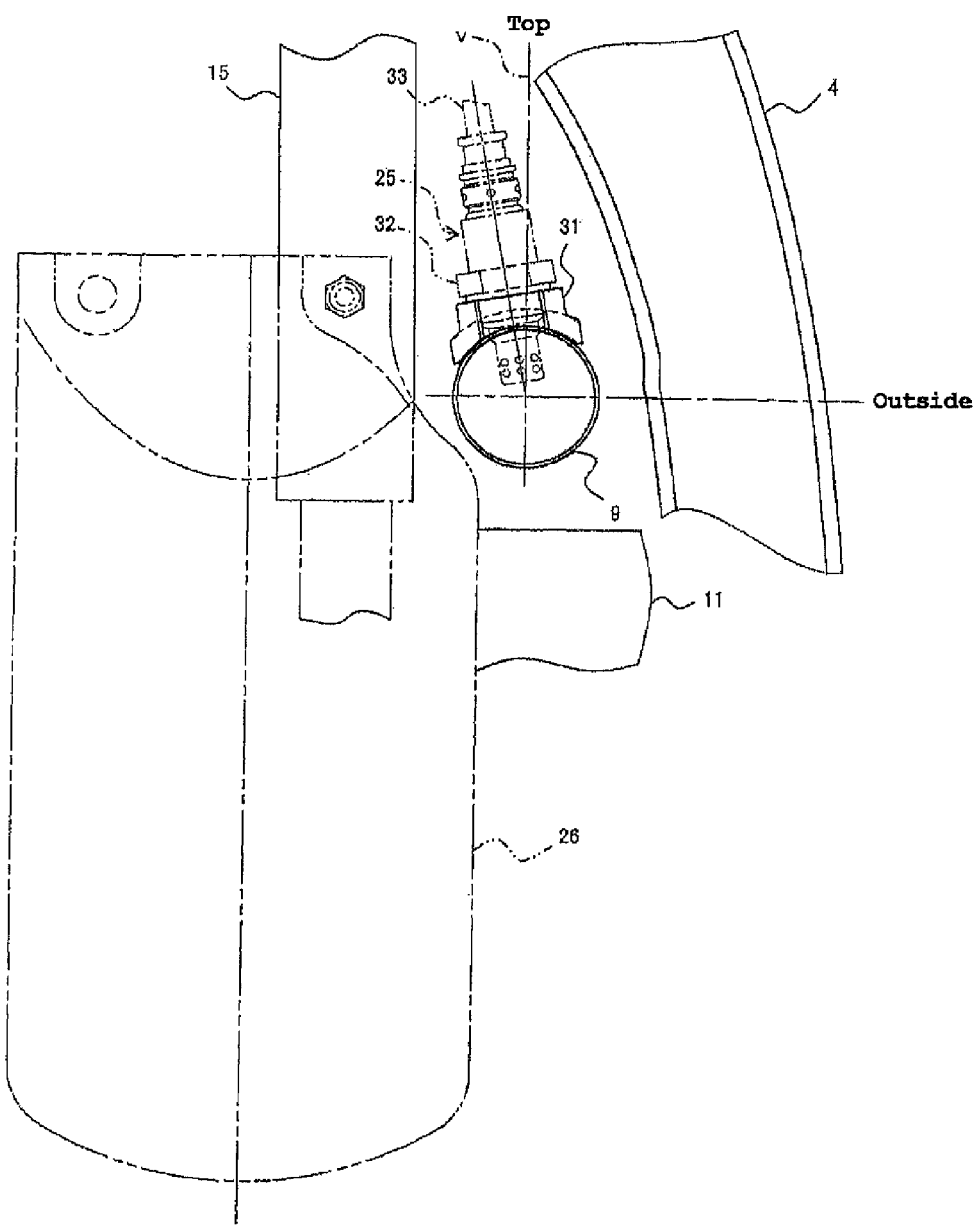

MOTORCYCLE

RELATED APPLICATIONS

This application claims the benefit of priority under 35 USC 119 of Japanese patent application nos. 2006-240840, filed on Sep. 5, 2006, which application is hereby incorporated by reference in its entirety.

BACKGROUND OF THE INVENTION

1. Field of the Invention

The present invention relates to a motorcycle with an exhaust gas sensor.

2. Description of Related Art

In recent years, increasingly stricter exhaust gas restrictions have been imposed on vehicles worldwide. To cope with such restrictions, vehicles use catalysts to purify exhaust gas in the exhaust pipe. In addition, vehicles must be equipped with an exhaust gas sensor for detecting the concentration of oxygen and the concentration of unburned gas in the exhaust pipe, thereby checking the actual air-fuel ratio of the engine to control the supply of fuel.

A structure for arranging or attaching an exhaust gas sensor for a motorcycle has been proposed. In the proposed structure, an exhaust gas sensor is arranged in a cylinder head of an internal combustion engine. In the cylinder head, an intake valve and an exhaust valve are arranged in a V-configuration at the top of the internal combustion engine. An exhaust port extends to curve from an axial direction of the exhaust valve in a direction opposite to the intake valve which intersects an axis of a cylinder. A downstream end of the exhaust port has a flange to which a member of an exhaust system is attached.

With this structure, the exhaust gas sensor is positioned around the flange of the exhaust port to be inclined relative to the axis of the cylinder, being located at the outside of the exhaust port. Accordingly, no large space is needed for the arrangement of the exhaust gas sensor, and no additional protector for the exhaust gas sensor is needed (see JP-A-2004-316430, Abstract and FIG. 4, for example).

Another structure for arranging an exhaust gas sensor for a motorcycle has been proposed. In a motorcycle including this structure, an engine with a bottom projection, such as an oil pan, is positioned between a front wheel and a rear wheel. An exhaust pipe extends from the engine rearward through the bottom side of the bottom projection. An exhaust gas sensor is attached vertically to a sensor attachment part on the upper part of the exhaust pipe and at a position separated rearward by a certain distance from the rear of the bottom projection.

With this structure, the exhaust gas sensor can be protected by the bottom projection and the exhaust pipe against flying stones. Thus, the need for a protective cover can be obviated, effecting a reduction in cost of design and production (see JP-A-Hei 11-343895, Abstract and FIG. 2, for example).

JP-A-2004-316430 is directed to the structure of arranging an exhaust gas sensor for a scooter-type motorcycle. JP-A-Hei 11-343895 is directed to the structure for arranging an exhaust gas sensor for a large motorcycle having an oil pan at the bottom of an engine.

The scooter-type motorcycle described in JP-A-2004-316430 has a large cover covering the engine and parts around the engine and connected to a rider's seat. Thus, if the motorcycle only has the structure for preventing the exhaust gas sensor against stones flying from below, no additional protection against flying stones is needed for the exhaust gas sensor.

In the large motorcycle described in JP-A-Hei 11-343895, the exhaust gas sensor can be protected against flying stones by the bottom projection and the exhaust pipe. However, it is unsatisfactory that no consideration is given to foreign matter coming from the lateral sides.

Generally, most large motorcycles manufactured by Japanese motorcycle manufacturers are models shipped to Europe that are compatible with European exhaust gas restrictions stricter than Japanese exhaust gas restrictions.

Meanwhile, many motorcycles available in the Japanese market are small. Among others, on and off-road motorcycles (designed for running on both paved public roads and unpaved roads or roadless ground) have gained increasing popularity lately.

On and off-road motorcycles must typically have a lightweight structure. For this reason, covers and other similar parts are made as small as possible or omitted other than the minimum required. When an exhaust gas sensor is attached to an exhaust pipe of an on and off-road motorcycle, attachment of a protective cover causes problems related to weight which contradicts the requirements above.

In addition, an on and off-road motorcycle may often fall. Thus, protective measures must be taken against damage to various parts of the motorcycle in case of a fall.

Exhaust-gas sensors, especially $O_2$ sensors, generally use oxygen extracted from the atmosphere to detect exhaust gas components in the exhaust pipe (detect the air-fuel ratio). Thus, if an ambient air inlet of the exhaust gas sensor is covered with foreign matter such as mud, ambient air will not be introduced smoothly, and the detection function of the sensor will be significantly damaged.

On and off-road motorcycles may run on bad roads having conditions such as slush, as well as in cities. Thus, the exhaust gas sensor must be protected against sprayed mud as well as flying stones.

More specifically, in commonly available motorcycles, the protection against flying stones only aims at preventing breakage of the exhaust gas sensor. The protection against sprayed mud aims at preventing the detection function of the sensor from being reduced.

However, the idea of protecting the exhaust gas sensor against sprayed mud as described above is not disclosed in JP-A-2004-316430 or in JP-A-Hei 11-343895. In addition, on and off-road motorcycles often undergo model changeovers. Installation of exhaust gas sensors will be indispensable for future new models of one and off motorcycles.

SUMMARY OF THE INVENTION

In view of the foregoing problems, the present invention provides a motorcycle in which an exhaust gas sensor is arranged to be protected against sprayed mud as well as flying stones without a dedicated protective cover, so that the vehicle body does not increase in weight.

A motorcycle according to the present invention includes a main frame; an engine mounted to the main frame; an exhaust pipe connected to the engine; and an exhaust gas sensor attached to, the exhaust pipe. The exhaust gas sensor is shielded by the main frame on the outside in a vehicle width direction.

In one embodiment, the main frame extends obliquely downward and rearward from a front end connected to a head pipe, and the direction in which the exhaust gas sensor is attached coincides with the direction in which the main frame extends.

In one embodiment, the exhaust gas sensor is attached to an upper part of the exhaust pipe.

In one embodiment, an exhaust gas sensor attachment part of the exhaust pipe is positioned between one side of the engine and the main frame, as seen from above.

In one embodiment, the exhaust pipe extends longitudinally of the vehicle, the main frame extends vertically, and the exhaust gas sensor is positioned in a portion of the exhaust pipe which intersects the main frame.

In one embodiment, the exhaust gas sensor is inclined inward to the inside of the motorcycle relative to a vertical line passing through the sensor attachment part of the exhaust pipe.

In one embodiment, the motorcycle further includes a rear wheel, a rear arm for supporting the rear wheel, and a pivot shaft for pivotally supporting the rear arm suspended at the main frame, wherein the exhaust gas sensor is positioned above the pivot shaft.

In one embodiment, the motorcycle further includes a rear wheel, a rear arm for supporting the rear wheel; and a shock absorber coupling the main frame and the rear arm, wherein the exhaust gas sensor is positioned in front of the shock absorber.

In one embodiment, the motorcycle further includes a rear wheel and a mud flap in front of the rear wheel, wherein the exhaust gas sensor is positioned in front of the mud flap.

In one embodiment, the exhaust gas sensor is an $O_2$ sensor.

According to the present invention, a structure for arranging an exhaust gas sensor for an on and off-road motorcycle is provided in which the exhaust gas sensor is protected against sprayed mud as well as flying stones without a dedicated protective cover, so that the vehicle body is not increased in weight.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 3 is an enlarged top view illustrating the arrangement of the exhaust gas sensor and an exhaust pipe.

FIG. 4 is a cross sectional view taken along lines A-A' of FIGS. 2 and 3.

DETAILED DESCRIPTION OF THE INVENTION

An embodiment of the present invention is now described with reference to the drawings.

First Embodiment

Figure 1:
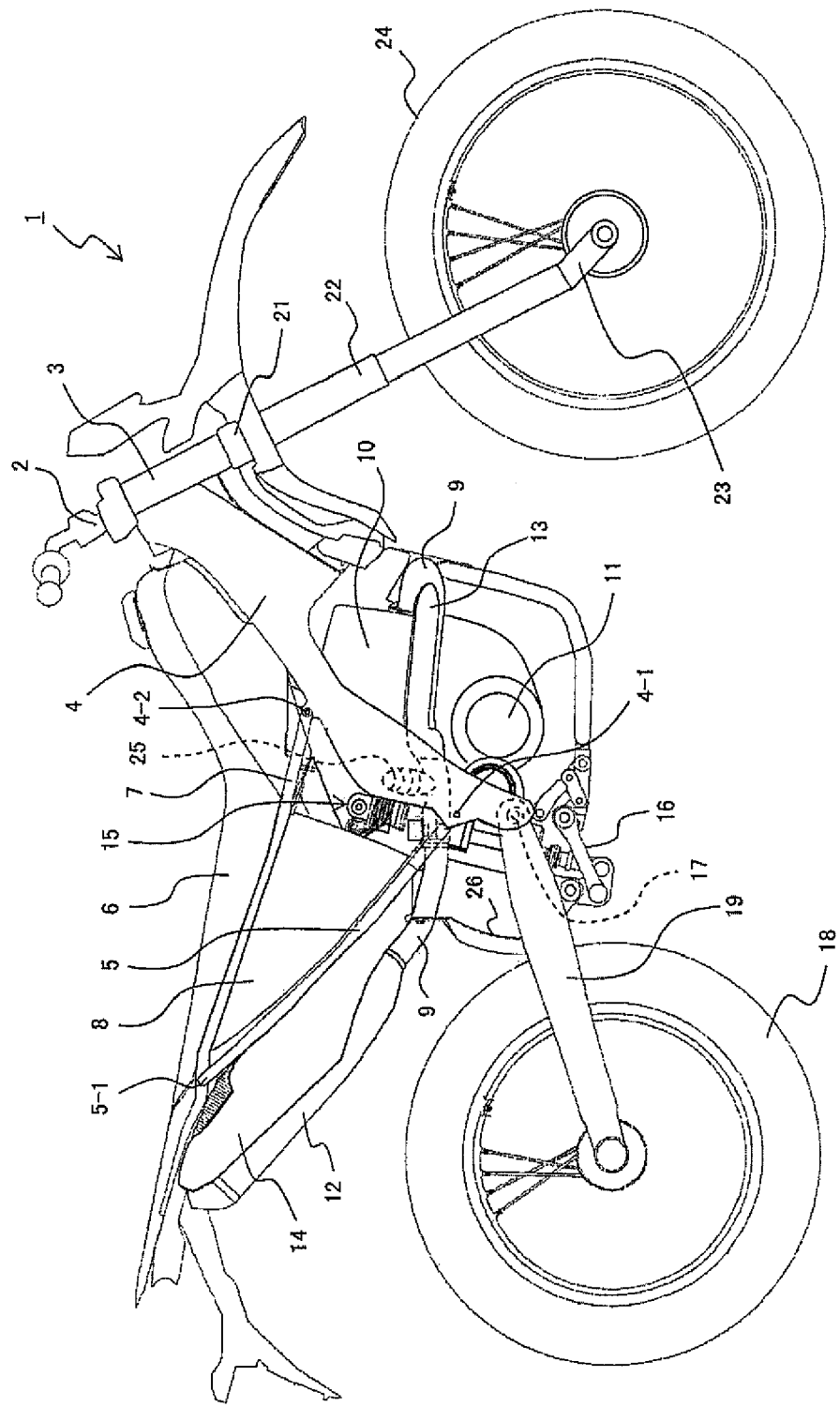
FIG. 1 is a side view of a motorcycle including a structure for arranging an exhaust gas sensor in accordance with an embodiment of the present invention.

FIG. 1 is a side view of a motorcycle 1 including a structure for arranging an exhaust gas sensor in accordance with an embodiment of the present invention. Motorcycle 1 of FIG. 1 is an on and off-road motorcycle.

Motorcycle 1 includes a main frame 4 having a front end connected to a head pipe 3. Head pipe 3 is fitted over at least a steering shaft 2. Main frame 4 extends obliquely downward and rearward from the front end connected to head pipe 3.

Main frame 4 has an engagement part 4-1 in proximity to a lower end. Engagement part 4-1 is engaged with a front end of a rear frame 5. Rear frame 5 extends from engagement part 4-1 obliquely upward and rearward. A rear end 5-1 of rear frame 5 is coupled to a seat rail 7 in proximity to its rear end. Seat rail 7 supports a seat 6 thereunder.

Seat rail 7 has a front end engaged with an engagement part 4-2 in the middle of main frame 4. Seat rail 7 extends rearward along the bottom of seat 6. Between seat rail 7 and rear frame 5, a side cover 8 is provided that covers part of the side of a vehicle body below the seat.

An exhaust pipe 9 extends from an exhaust opening in a front part of an engine 10 to a side of engine 10, passes above a crankcase 11 and through the inside in a vehicle width direction of main frame 4 and rear frame 5, and extends to a position at which exhaust pipe 9 is attached to a muffler 12.

A protective cover 13 is disposed on exhaust pipe 9 to protect a rider's leg (i.e., the rider's calf) 20 (FIG. 3) against high heat from exhaust pipe 9. Protective cover 13 extends from a rearwardly-curved part of exhaust pipe 9 proximate to the exhaust opening located at the front of engine 10 to a position where exhaust pipe 9 passes through the inside of main frame 4.

Another protective cover 14 is attached to protect a rear passenger's leg (specifically a portion from the heel to the calf) against high heat from muffler 12. Protective cover 14 is disposed on an upper part of muffler 12 and covers substantially one fourth in a circumferential direction of muffler 12.

In this manner, the portion around exhaust pipe 9 is designed to protect the rider's and rear passenger's legs from high heat.

In a central portion inside the vehicle body, a shock absorber 15 is disposed to absorb shock due to vertical vibration of seat 6. Shock absorber 15 includes a cylinder, a spiral spring and a piston. A lower end of the piston is engaged with a pivot shaft 17 via a plurality of links 16.

A rear wheel support arm 19 has one end supporting an axle of a rear wheel 18. The other end of support arm 19 is engaged with pivot shaft 17 at the lower end of main frame 4.

A front fork 22 extends obliquely forward from a steering bracket 21. A lower end of front fork 22 supports a support shaft of a front wheel 24 via a front axle 23.

Substantially all parts of motorcycle 1 other than front wheel 24 and rear wheel 18 are arranged in a central portion of the vehicle body in an inverse triangular configuration. It should also be noted that a mud flap 26 is disposed between shock absorber 15 and rear wheel 18.

In this centralized structure of motorcycle 1, an exhaust gas sensor 25 is disposed in exhaust pipe 9 at a position where the rider and rear passenger will undergo no adverse effect of heat conduction from exhaust pipe 9 and where exhaust gas sensor 25 will not encounter mud or sustain damage in case of a fall of motorcycle 1.

Figure 2:
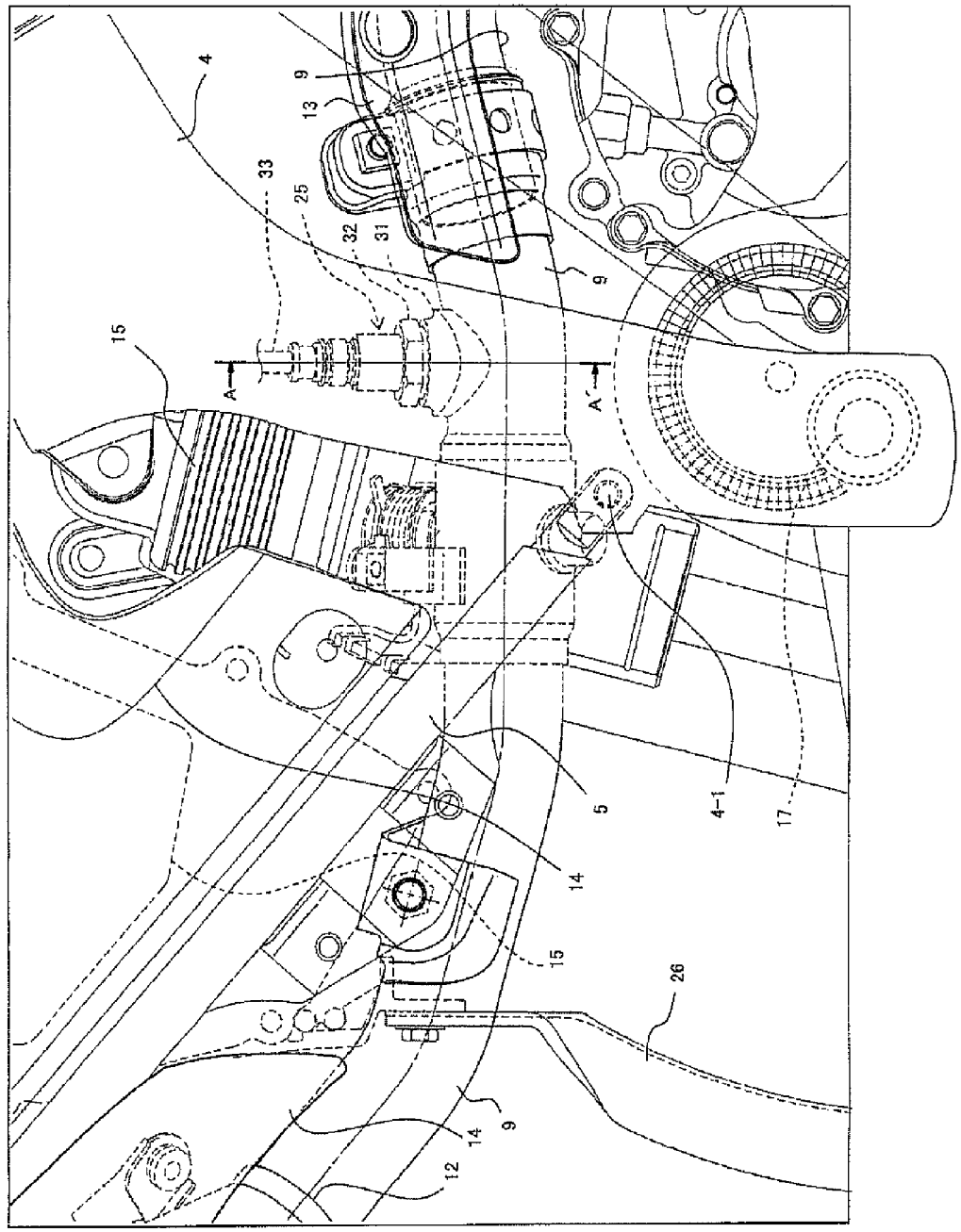
FIG. 2 is an enlarged side view of a portion of FIG. 1 focusing on the exhaust gas sensor.

FIG. 2 is an enlarged side view of motorcycle 1 focusing on exhaust gas sensor 25. FIG. 3 is an enlarged top view illustrating the arrangement of exhaust gas sensor 25 and exhaust pipe 9. FIG. 4 is a cross sectional view taken along lines A-A' of FIGS. 2 and 3. Referring now to FIGS. 2-4, a structure for arranging exhaust gas sensor 25 is described.

As shown in FIGS. 2 and 3, exhaust gas sensor 25 is securely attached to a sensor attachment part 31 with a nut 32. Sensor attachment part 31 is formed on the upper part of exhaust pipe 9 on the inside of main frame 4.

Exhaust gas sensor 25 is connected to a signal wire 33 through which the detection of exhaust gas components (air-fuel ratio) is transmitted to a controller. Based on the detection of exhaust gas components fed back from exhaust gas sensor 25, a control unit optimizes the supply of fuel (injection amount of gasoline) to engine 10.

As described above, exhaust gas sensor 25 is attached to a position where exhaust gas sensor 25 is shielded by main frame 4 on the outside in the vehicle width direction. Exhaust gas sensor 25 is thus well protected by main frame 4 against stones, mud or the like flying from the lateral direction, even if no dedicated protective cover is provided.

Exhaust gas sensor 25 is positioned such that the direction in which exhaust gas sensor 25 is attached and the direction in which main frame 4 extends approximately coincide with each other, as shown in FIG. 2. As a result, the entire exhaust gas sensor 25 is well protected by main frame 4.

Exhaust gas sensor 25 is attached to sensor attachment part 31 formed on the upper part of exhaust gas pipe 9. Exhaust gas pipe 9 is thus positioned to protect exhaust gas sensor 25 against stones, mud or the like flying from below.

As described above, exhaust pipe 9 is connected to an exhaust opening 10-1 of engine 10 mounted to main frame 4, and extends from exhaust opening 10-1, passing by one side of engine 10 and passing through the inside of main frame 4. Thus, as seen from above (FIG. 3), exhaust gas sensor attachment part 31 is positioned between the one side of the engine and main frame 4.

Accordingly, exhaust gas sensor 25 is at a position where it is well protected by engine 10 and main frame 4 against stones, mud or the like flying from both sides.

As shown in FIG. 2, exhaust gas sensor 25 in accordance with this embodiment is positioned in a portion where exhaust pipe 9 extending longitudinally of the vehicle and main frame 4 extending vertically intersect each other. Accordingly, exhaust gas sensor 25 is at a position where it is protected against stones, mud or the like flying from the lateral outside by main frame 4.

As shown in FIG. 4, exhaust gas sensor 25 in accordance with this embodiment is inclined inward to the inside of the vehicle body relative to a vertical line "v" passing through sensor attachment part 31 of exhaust pipe 9. Accordingly, exhaust gas sensor 25 is at a position where it is well protected by exhaust pipe 9 and main frame 4 against stones, mud or the like flying from below or from the lateral outside.

As shown in FIG. 2, pivot shaft 17 is suspended at the lower end of main frame 4 for pivotally supporting rear arm 19, which supports rear wheel 18. Exhaust gas sensor 25 in accordance with this embodiment is positioned above pivot shaft 17. Accordingly, exhaust gas sensor 25 is at a position where it is well protected by pivot shaft 17 against stones, mud or the like flying from below exhaust pipe 9.

Exhaust gas sensor 25 is positioned in front of shock absorber 15, as shown in FIGS. 1-3. Accordingly, exhaust gas sensor 25 is at a position where it is well protected by shock absorber 15 against stones, mud or the like flying from the rear wheel 18 side.

Exhaust gas sensor 25 is positioned in front of mud flap 26 disposed in front of rear wheel 18. Accordingly, exhaust gas sensor 25 is at a position where it is well protected by mud flap 26 against stones, mud or the like flying from the rear wheel 18 side.

With the structure for arranging an exhaust gas sensor for a motorcycle in accordance with this embodiment, the exhaust gas sensor is protected against flying stones and sprayed mud from the longitudinal, vertical and lateral directions, even though no dedicated protective cover is provided.

Therefore, the present invention provides a structure for arranging an exhaust gas sensor in which the vehicle body does not increase in weight and the exhaust gas sensor is not easily encountered by foreign matter such as mud sprayed from the surroundings.

The particular embodiments of the invention described in this document should be considered illustrative, rather than restrictive. Modification to the described embodiments may be made without departing from the spirit of the invention as defined by the following claims.

The invention claimed is:

1. A motorcycle comprising:
   a main frame;
   an engine mounted to the main frame;
   an exhaust pipe connected to the engine; and
   an exhaust gas sensor attached to the exhaust pipe, wherein the exhaust gas sensor is shielded by a portion of the main frame extending outside of the exhaust gas sensor in a vehicle width direction.

2. The motorcycle according to claim 1, further comprising a head pipe, wherein the main frame extends obliquely downward and rearward from a front end connected to the head pipe.

3. The motorcycle according to claim 2, wherein a direction in which the exhaust gas sensor extends coincides with a direction in which the main frame extends.

4. The motorcycle according to claim 3, wherein the exhaust gas sensor is attached to an upper part of the exhaust pipe.

5. The motorcycle according to claim 1, wherein an exhaust gas sensor attachment part of the exhaust pipe is positioned between one side of the engine and the main frame, in a top plan view.

6. The motorcycle according to claim 5, wherein the exhaust pipe extends longitudinally along the vehicle, the main frame extends vertically, and the exhaust gas sensor is positioned in a portion of the exhaust pipe which intersects the main frame.

7. The motorcycle according to claim 1, wherein the exhaust gas sensor is inclined inward to an inside of the motorcycle relative to a vertical line passing through a sensor attachment part of the exhaust pipe.

8. The motorcycle according to claim 1, further comprising a rear wheel;
   a rear arm for supporting the rear wheel; and
   a pivot shaft for pivotally supporting the rear arm suspended at the main frame, wherein the exhaust gas sensor is positioned above the pivot shaft.

9. The motorcycle according to claim 1, further comprising:
   a rear wheel;
   a rear arm for supporting the rear wheel; and
   a shock absorber coupling the main frame and the rear arm, wherein the exhaust gas sensor is positioned in front of the shock absorber.

10. The motorcycle according to claim 1, further comprising:
    a rear wheel; and
    a mud flap in front of the rear wheel, wherein the exhaust gas sensor is positioned in front of the mud flap.

11. The motorcycle according to claim 1, wherein the exhaust gas sensor is an $O_2$ sensor.

12. A protective structure for an exhaust gas sensor of a motorcycle, comprising:
    an engine and a main frame positioned on sides of the exhaust gas sensor;
    an exhaust pipe positioned below and attached to the exhaust gas sensor;
    and
    a mud flap positioned behind the exhaust gas sensor, wherein the gas sensor is inclined inward to an inside of the motorcycle relative to a vertical line passing through a sensor attachment part of the exhaust pipe.

13. The protective structure of claim 12, wherein a direction in which the exhaust gas sensor extends coincides with a direction in which the main frame extends.

14. The protective structure of claim 12, wherein:

the exhaust pipe extends longitudinally along the motorcycle, the main frame extends vertically, and the exhaust gas sensor is positioned in a portion of the exhaust pipe which intersects the main frame.

15. The protective structure of claim 12, and further comprising:

a pivot shaft for pivotally supporting a rear arm suspended at the main frame, wherein the exhaust gas sensor is positioned above the pivot shaft.

* * * * *